(12) United States Patent
Shibazaki et al.

(10) Patent No.: US 10,739,625 B2
(45) Date of Patent: Aug. 11, 2020

(54) DISPLAY DEVICE (71) Applicant: Innolux Corporation, Miao-Li County (TW)

(72) Inventors: Minoru Shibazaki, Miao-Li County (TW); Kazuto Jitsui, Miao-Li County (TW); Satoru Takahashi, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 50 days.

(21) Appl. No.: 16/115,674

(22) Filed: Aug. 29, 2018

(65) Prior Publication Data

US 2020/0073156 A1 Mar. 5, 2020

(51) Int. Cl.
  *G02F 1/13* (2006.01)
  *G02F 1/1335* (2006.01)
  *G02F 1/13363* (2006.01)
  *G02F 1/1343* (2006.01)
  *G02F 1/1337* (2006.01)
  *G02F 1/1339* (2006.01)

(52) U.S. Cl.
  CPC ........ *G02F 1/1323* (2013.01); *G02F 1/13363* (2013.01); *G02F 1/13394* (2013.01); *G02F 1/133528* (2013.01); *G02F 1/133784* (2013.01); *G02F 1/134336* (2013.01); *G02F 2001/13396* (2013.01); *G02F 2001/133531* (2013.01); *G02F 2201/123* (2013.01); *G02F 2413/01* (2013.01); *G02F 2413/02* (2013.01)

(58) Field of Classification Search
  CPC ............... G02F 1/1323; G02F 1/13363; G02F 2202/40; G02F 2001/133638; G02F 2413/01; G02F 2413/02; G02F 1/133528; G02F 1/13362; G02F 2001/133531; G02F 1/13394; G02F 2001/13396; G02B 5/3083; G02B 5/3033; G02B 5/3025; G02B 27/26; Y10T 428/1041
  See application file for complete search history.

(56) References Cited

U.S. PATENT DOCUMENTS

2005/0174529 A1* 8/2005 Fukushima ........... G02F 1/1323
  349/197
2008/0309858 A1* 12/2008 Ojima ................ G02F 1/13363
  349/106

(Continued)

*Primary Examiner* — Jia X Pan
(74) *Attorney, Agent, or Firm* — McClure, Qualey & Rodack, LLP.

(57) ABSTRACT

A display device includes a switching panel. The switching panel includes a first polarizer, a second polarizer, a first substrate, a second substrate, and a display medium layer. The first polarizer includes a first absorption axis. The second polarizer is disposed opposite to the first polarizer. The second polarizer includes a second absorption axis parallel to the first absorption axis. The first substrate is disposed between the first polarizer and the second polarizer. The first substrate includes a first alignment layer having a first alignment direction. The second substrate is disposed between the first polarizer and the second polarizer. The second substrate includes a second alignment layer having a second alignment direction. The second alignment direction is parallel or anti-parallel to the first alignment direction. The display medium layer is disposed between the first substrate and the second substrate.

14 Claims, 10 Drawing Sheets

(56) References Cited

U.S. PATENT DOCUMENTS

| | | | | |
|---|---|---|---|---|
| 2009/0190048 | A1* | 7/2009 | Hong | G02B 27/2214 |
| | | | | 349/15 |
| 2010/0128200 | A1* | 5/2010 | Morishita | G02F 1/1323 |
| | | | | 349/62 |
| 2014/0232960 | A1* | 8/2014 | Schwartz | G02B 26/004 |
| | | | | 349/12 |
| 2015/0362741 | A1* | 12/2015 | Oh | G02B 27/2214 |
| | | | | 349/15 |
| 2016/0195731 | A1* | 7/2016 | Murao | G02F 1/1347 |
| | | | | 349/15 |
| 2017/0045763 | A1* | 2/2017 | Murao | G02B 27/2214 |
| 2017/0219859 | A1* | 8/2017 | Christophy | G02F 1/1323 |
| 2018/0052346 | A1* | 2/2018 | Sakai | G02F 1/1347 |
| 2019/0196236 | A1* | 6/2019 | Chen | G02F 1/1323 |

* cited by examiner

DISPLAY DEVICE

TECHNICAL FIELD

The disclosure relates in general to a display device, and more particularly to a viewing angle controlling display device.

BACKGROUND

Electronic products with display devices, such as smart phones, tablets, notebook computers, monitors, and TVs, have become indispensable necessities to modern people no matter in their work, study or entertainment. With a flourishing development of the portable electronic products, the consumers not only pursue better electronic characteristics such as higher display quality, higher speed of response, longer life span or higher reliability, but also have higher expects on the functions of the products to be more diversified.

SUMMARY

The disclosure is directed to a display device.

According to an embodiment of the disclosure, a display device is provided. The display device comprises a switching panel. The switching panel comprises a first polarizer, a second polarizer, a first substrate, a second substrate, and a display medium layer. The first polarizer comprises a first absorption axis. The second polarizer is disposed opposite to the first polarizer. The second polarizer comprises a second absorption axis parallel to the first absorption axis. The first substrate is disposed between the first polarizer and the second polarizer. The first substrate comprises a first alignment layer having a first alignment direction. The second substrate is disposed between the first polarizer and the second polarizer. The second substrate comprises a second alignment layer having a second alignment direction. The second alignment direction is parallel or anti-parallel to the first alignment direction. The display medium layer is disposed between the first substrate and the second substrate.

The above and other aspects of the disclosure will become better understood with regard to the following detailed description of the non-limiting embodiment(s). The following description is made with reference to the accompanying drawings.

DETAILED DESCRIPTION

The terms "about" and "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" can mean within one or more standard deviations, or within .+−.20%, .+−.15%, .+−.10%, .+−.5%, .+−.3% of the stated value. It is noted that the term "same" may also refer to "about" because of the process deviation or the process fluctuation. Moreover, when a first axis (direction) is substantially parallel to a second axis (direction), it may refer that the included angle between the first axis and the second axis may be in a range from −10° to 10°, such as 0° or 5°. When a first axis (direction) is substantially perpendicular to a second axis (direction), it may refer that the included angle between the first axis and the second axis may be in a range from 80° to 100°, such as 90°.

It should be noted that the elements or devices in the drawings of the present disclosure may be present in any form or configuration known to those skilled in the art. In addition, the expression "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

Figure 1:
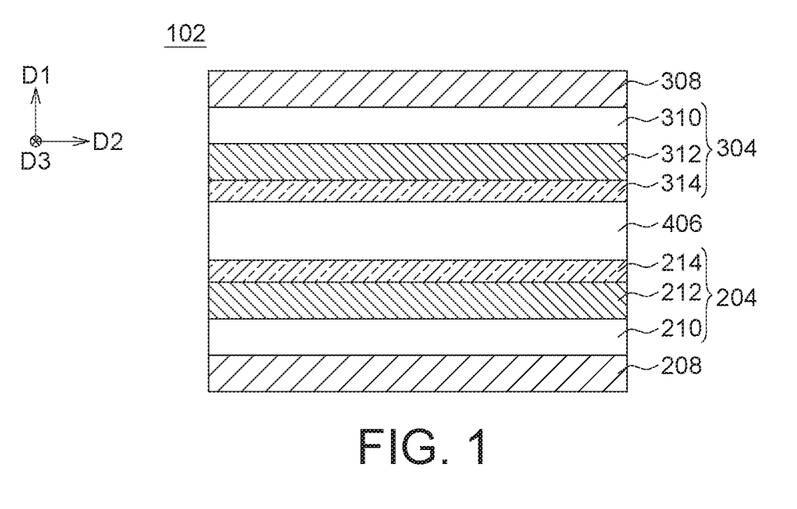
FIG. 1 illustrates a cross-section view of a switching panel of a display device according to an embodiment.

FIG. 1 illustrates a cross-section view of a switching panel 102 of a display device according to an embodiment. In one embodiment, the display device may be an ATM, a notebook computer, a personal computer, or other suitable apparatus. The switching panel 102 comprises a first substrate 204, a second substrate 304, a display medium layer 406, a first polarizer 208 and a second polarizer 308.

The first substrate 204 may comprise a base layer 210 (e.g. first base layer), an electrode layer 212 (e.g. first electrode layer) and a first alignment layer 214. In some examples, the electrode layer 212 may be disposed on the base layer 210. The first alignment layer 214 may be disposed on the electrode layer 212 along a direction D1 (e.g. Z direction).

The second substrate 304 may comprise a base layer 310 (e.g. second base layer), an electrode layer 312 (e.g. second electrode layer) and a second alignment layer 314. In some examples, the electrode layer 312 may be disposed on the base layer 310. The second alignment layer 314 may be disposed on the electrode layer 312 along the direction D1. In examples, the first substrate 204 and the second substrate 304 may include other suitable layers individually, such as an optical layer, a passivation layer, or an electrical component layer.

The material of the base layer 210 and the base layer 310 may comprise a transparent material. In an embodiment, the material of the base layer 210 and/or the base layer 310 may comprise a glass, and/or a polymer material. For example, the polymer material may be polyimide. In another embodiment, the material of the base layer 210 and/or the base layer 310 may comprise a material having an out of plane retardation (or so-called retardation in thickness, Rth), and the retardation in thickness is in a suitable range.

The material of the electrode layer 212 and the electrode layer 312 may comprise a conductive material. For example, the material of the electrode layer 212 and the electrode layer 312 may comprise a transparent conductive material, such as indium tin oxide (ITO), etc.

The display medium layer 406 may be disposed between the first substrate 204 and the second substrate 304. The display medium layer 406 may comprise a liquid crystal material. The display medium layer 406 may also include a dye material, and the concentration of the dye material may be less than 5 wt. %, such as 1 wt. % or 3 wt. %. In other words, the dye material may occupies 0 wt. % to 5 wt. % of the display medium layer 406. For example, a weight of the dye material may be 0% to 5% of a total weight of the liquid crystal material and the dye material.

The first polarizer 208 may be disposed on the base layer 210 of the first substrate 204. The second polarizer 308 may be disposed on the base layer 310 of the second substrate 304. The first substrate 204, the second substrate 304 and the display medium layer 406 may be disposed between the first polarizer 208 and the second polarizer 308.

Figure 2:
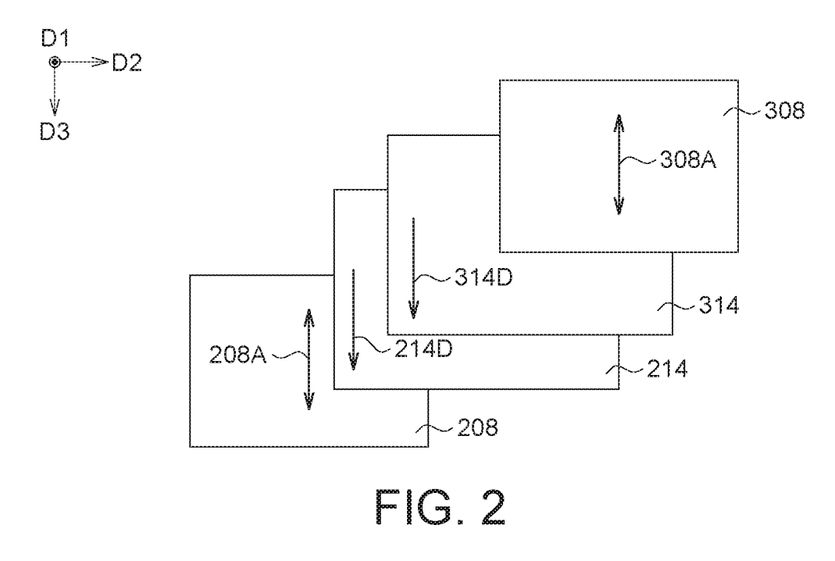
FIG. 2 illustrates an arrangement design for a first polarizer, a first alignment layer of a first substrate, a second alignment layer of a second substrate and a second polarizer according to an embodiment.
Figure 3:
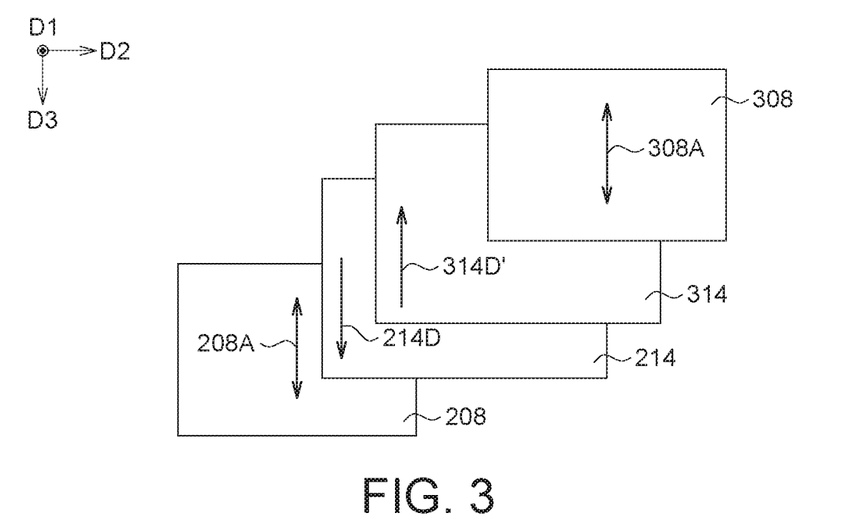
FIG. 3 illustrates an arrangement design for a first polarizer, a first alignment layer of a first substrate, a second alignment layer of a second substrate and a second polarizer according to an embodiment.

FIG. 2 and FIG. 3 illustrate arrangement designs for the first polarizer 208, the first alignment layer 214 of the first substrate 204, the second alignment layer 314 of the second substrate 304 and the second polarizer 308 according to an embodiment, which may be applied to the switching panel according to various embodiments. The first polarizer 208 has a first absorption axis 208A. The first alignment layer 214 has a first alignment direction 214D. The second polarizer 308 has a second absorption axis 308A. The second alignment layer 314 has a second alignment direction 314D as shown in FIG. 2. In one example, the alignment direction may be a rubbing direction, a photo-alignment direction, or other suitable alignment directions depending on the alignment methods. In some examples, the first alignment direction 214D of the first alignment layer 214 of the first substrate, the second alignment direction 314D of the second alignment layer 314 of the second substrate, the first absorption axis 208A of the first polarizer 208, and the second absorption axis 308A of the second polarizer 308 are substantially parallel to the same direction such as the direction D3. In other examples, the first alignment direction 214D and the second alignment direction 314D may be substantially perpendicular to the first absorption axis 208A and the second absorption axis 308A. In this embodiment, the first alignment direction 214D of the first alignment layer 214 is substantially parallel to the second alignment direction 314D of the second alignment layer 314. In other words, the first alignment layer 214 and the second alignment layer 314 are formed by rubbing along the same direction.

When the first alignment direction 214D of the first alignment layer 214 is substantially parallel to the second alignment direction 314D of the second alignment layer 314, liquid crystal molecules in the display medium layer 406 may be orientated with long axes twisted gradually along the direction D1.

In other embodiments, the first alignment direction 214D of the first alignment layer 214 may be substantially anti-parallel to the second alignment direction 314D' of the second alignment layer 314 as shown in FIG. 3. In other words, the first alignment layer 214 and the second alignment layer 314 are formed by rubbing along opposing directions respectively.

When the first alignment direction 214D of the first alignment layer 214 is substantially anti-parallel relative to the second alignment direction 314D' of the second alignment layer 314, liquid crystal molecules in the display medium layer 406 may be orientated with long axes of the same direction substantially.

Figure 4:
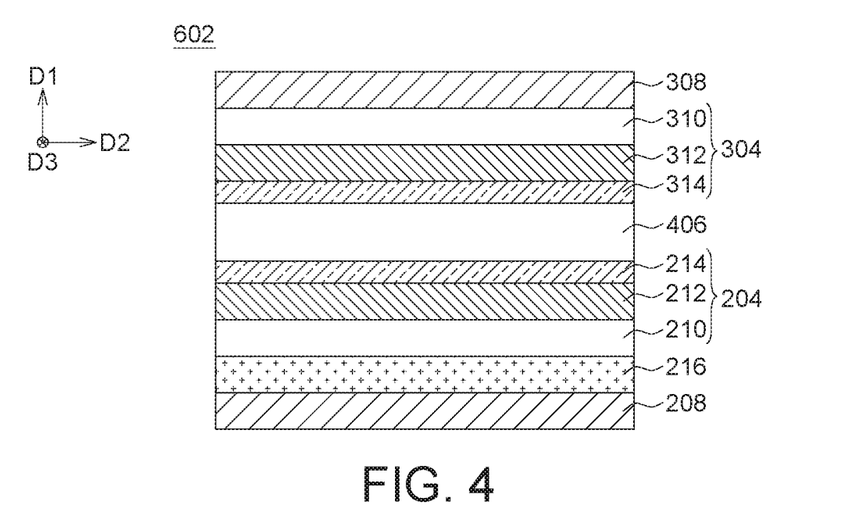
FIG. 4 illustrates a cross-section view of a switching panel of a display device according to another embodiment.

FIG. 4 illustrates a cross-section view of a switching panel 602 of a display device according to another embodiment. The difference between the switching panel 602 in FIG. 4 and switching panel 102 in FIG. 1 are described below. The switching panel 602 further comprises a compensating layer 216 (e.g. first compensating layer) disposed between the first substrate 204 and the first polarizer 208. The compensating layer 216 may have an Re (retardation in-plane) in a range from 0 nm to 135 nm, such as 40 nm, 80 nm, or 120 nm. The compensating layer 216 may have an Rth in a range from 40 nm to 1200 nm. In an embodiment, the compensating layer 216 has a slow axis. The slow axis may be substantially parallel or perpendicular to the first alignment direction 214D of the first alignment layer 214. In an embodiment, the material of the base layer 210 and the base layer 310 may comprise a glass or a polymer material, and so on.

Figure 5:
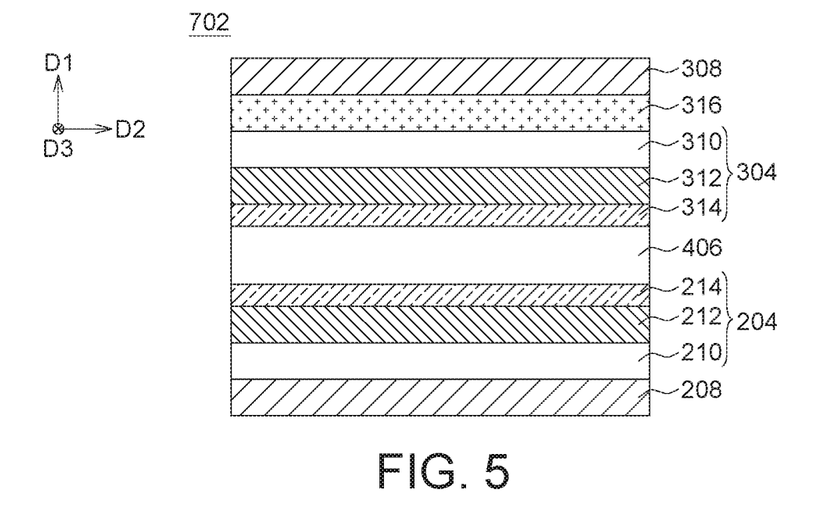
FIG. 5 illustrates a cross-section view of a switching panel of a display device according to another embodiment.

FIG. 5 illustrates a cross-section view of a switching panel 702 of a display device according to another embodiment. The difference between the switching panel 702 in FIG. 5 and the switching panel 102 in FIG. 1 is described below. The switching panel 702 further comprises a compensating layer 316 (e.g. second compensating layer) disposed between the second substrate 304 and the second polarizer 308. In some examples, the compensating layer 316 may have a Re of 0 nm-135 nm, such as 40 nm, 80 nm, or 120 nm. The compensating layer 316 may have a Rth in a range from 40 nm to 1200 nm. In an embodiment, the compensating layer 316 has a slow axis. The slow axis may be substantially parallel or perpendicular to the second alignment direction 314D of the second alignment layer 314.

Figure 6:
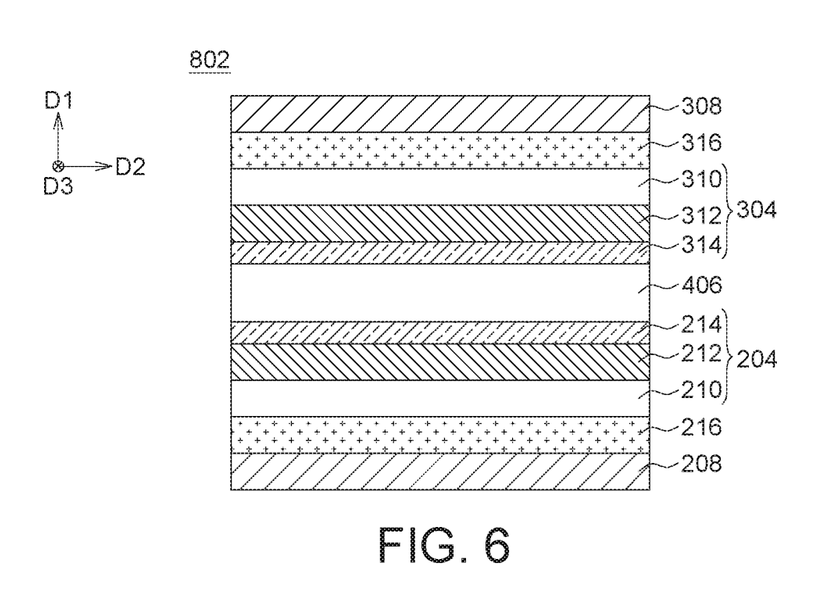
FIG. 6 illustrates a cross-section view of a switching panel of a display device according to another embodiment.

FIG. 6 illustrates a cross-section view of a switching panel 802 of a display device according to another embodiment. The difference between the switching panel 802 in FIG. 6 and the switching panel 102 in FIG. 1 is described below. The switching panel 802 further comprises the compensating layer 216 (e.g. first compensating layer) and the compensating layer 316 (e.g. second compensating layer). The compensating layer 216 is disposed between the first substrate 204 and the first polarizer 208. The compensating layer 316 may be disposed between the second substrate 304 and the second polarizer 308. In an embodiment, the compensating layer 216 and the compensating layer 316 may have a total Re in a range from 0 nm to 135 nm, such as 40 nm, 80 nm, or 120 nm. For example, the compensating layer 216 may have a Re in a range from 0 nm to 67.5 nm, and the compensating layer 316 may have a Re in a range from 0 nm to 67.5 nm. In an embodiment, the compensating layer 216 and the compensating layer 316 may have a total Rth in a range from 40 nm to 1200 nm. For example, the compensating layer 216 may have a Rth in a range from 20 nm to 600 nm, and the compensating layer 316 may have a Rth in a range from 20 nm to 600 nm. The slow axis of the compensating layer 216 may be substantially parallel or perpendicular to the first alignment direction 214D of the first substrate 204. The slow axis of the compensating layer 316 may be substantially parallel or perpendicular to the second alignment direction 314D of the second substrate 304. In embodiments, the switching panel according to various embodiments (such as the switching panel 102 in FIG. 1, the switching panel 602 in FIG. 4, the switching panel 702 in FIG. 5, the switching panel 802 in FIG. 6, or other possible switching panels according to the concepts discloses herein) has a cell retardation in a range from 400 nm to 1200 nm, such as 500 nm, 700 nm, 900 nm, or 1100 nm. In some examples; the cell retardation may be defined as a total retardation of the first substrate 204, the second substrate 304, and the display medium layer 406.

Figure 7:
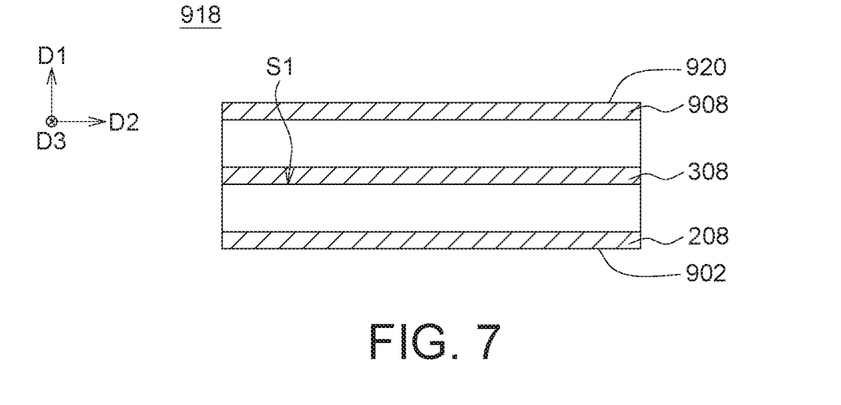
FIG. 7 illustrates a display device according to an embodiment.

FIG. 7 illustrates a display device 918 according to an embodiment. In an embodiment, the display device 918 includes a display device comprising a switching panel 902 and a display panel 920. For example, the switching panel 902 may be similar to embodiments shown in FIG. 1, FIG. 4, FIG. 5, FIG. 6, or other possible switching panels according to the concepts disclosed herein. An arrangement of the switching panel 902 relative to the display panel 920 may be illustrated with some omitted elements in FIG. 7 for the sake of brevity.

The display panel 920 may be a display panel known in the art. For example, the display panel 920 may be a liquid crystal display panel. For example, the display panel 920 may comprise a liquid crystal layer used for VA mode, FFS mode, TN mode, OCB mode, and so on. The display panel 920 has an image displaying side S1. In some of examples, the display panel 920 may be disposed on the switching panel 902. In an embodiment, the display panel 920 comprises a third polarizer 908. The second polarizer 308 may be shared by the switching panel 902 and the display panel 920. In other words, the second polarizer 308 may be used by the display panel 920. Third polarizer 908 has a third absorption axis. The third absorption axis of the third polarizer 908 may be not parallel to the first absorption axis 208A of the first polarizer 208 and/or the second absorption axis 308A of the second polarizer 308. In an embodiment, the third absorption axis of the third polarizer 908 may be substantially perpendicular to the first absorption axis 208A of the first polarizer 208 and the second absorption axis 308A of the second polarizer 308. In some examples, the positions of the switching panel 902 and the display panel 920 may be switched. That is, the switching panel 902 may be disposed on the display panel 920.

Figure 8:
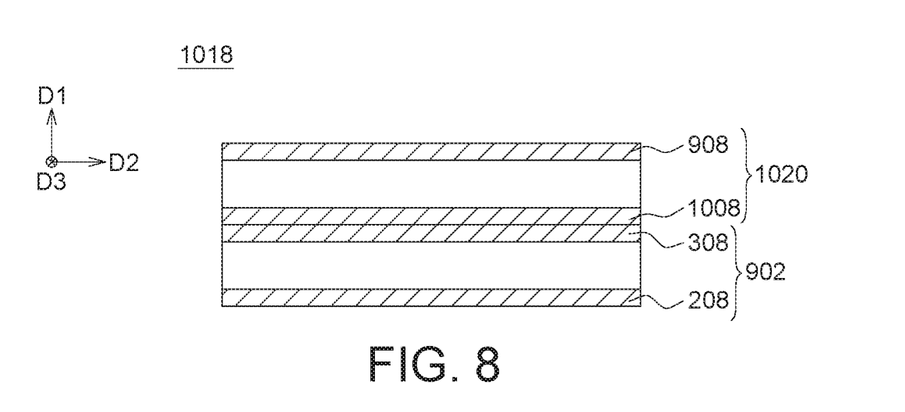
FIG. 8 illustrates a display device according to another embodiment.

FIG. 8 illustrates a display device 1018 according to another embodiment. The difference between the display device 1018 in FIG. 8 and the display device 918 in FIG. 7 is described below. A display panel 1020 comprises the third polarizer 908 and a fourth polarizer 1008. The fourth polarizer 1008 has a fourth absorption axis. The fourth absorption axis of the fourth polarizer 1008 may be not parallel to the third absorption axis of the third polarizer 908. In an embodiment, the fourth absorption axis of the fourth polarizer 1008 may be substantially perpendicular to the third absorption axis of the third polarizer 908. In some examples, the switching panel 902 may be disposed on the display panel 1020.

In other embodiments, the switching panel 902 may be disposed between a back light module and the display panel. The back light module may comprise a light guide with X-BEF, a collimated backlight, a direct type backlight, and so on.

In embodiments, the switching panel 902 may be a viewing angle switching panel, and the viewing angle of the display device can be switched between a wide viewing angle (sharing mode) and a narrow viewing angle (privacy mode) by operating the switching panel 902, for example by applying voltage biases to the switching panel 902.

In the sharing mode, no electric filed is applied to the switching panel, which may result in a liquid crystal molecule with a long axis being substantially parallel to the second absorption axis 308A (shown in FIG. 1) of the second polarizer 308 in both of a normal viewing angle and an oblique viewing angle. Therefore, a bright image can be seen by human eyes not only in the normal viewing angle, but also in the oblique viewing angle from the display device.

In the privacy mode, an electric filed is applied to the switching panel, which may result in an orientation change to a liquid crystal molecule with a long axis to be substantially parallel to the second absorption axis 308A (shown in FIG. 1) in the normal viewing angle, but not parallel to the second absorption axis 308A in the oblique viewing angle. Therefore, a bright image may be seen by human eyes in the normal viewing angle, while a dark image (for example, an image darker than the bright image seen in the normal viewing angle, or no image) may be seen in the oblique viewing angle from the display device.

Figure 9:
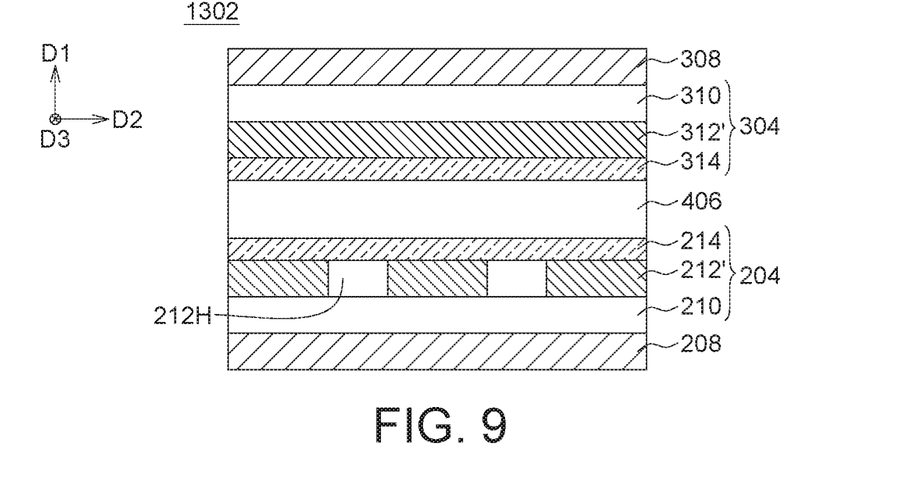
FIG. 9 illustrates a cross-section view of a switching panel of a display device according to another embodiment.

FIG. 9 illustrates a cross-section view of a switching panel 1302 of a display device according to another embodiment. The difference between the switching panel 1302 in FIG. 9 and the switching panel 102 in FIG. 1 is described below. The electrode layer 212' may be patterned and have a plurality of through holes 212H. In some examples, the electrode layer 312 may also be patterned. In an embodiment, at least one of the through holes 212H result in a light leakage, thus the pattern of the electrode layer 212' may cover the displayed images in the oblique viewing angle to enhance the privacy function.

Figure 10A:
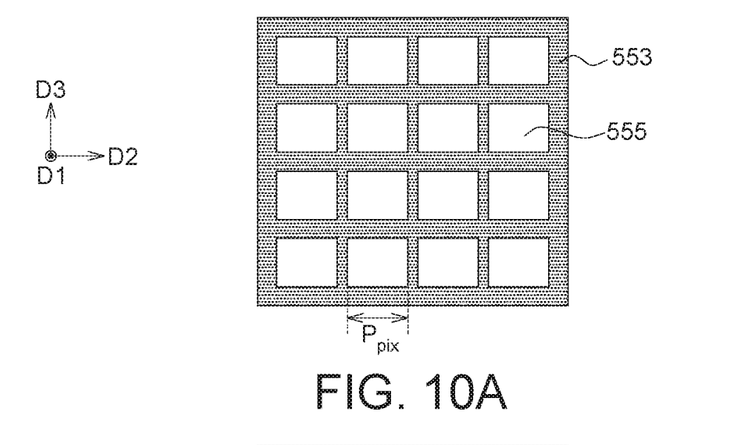
FIG. 10A shows a top view of a light shielding layer of a switching panel of a display device.
Figure 10B:
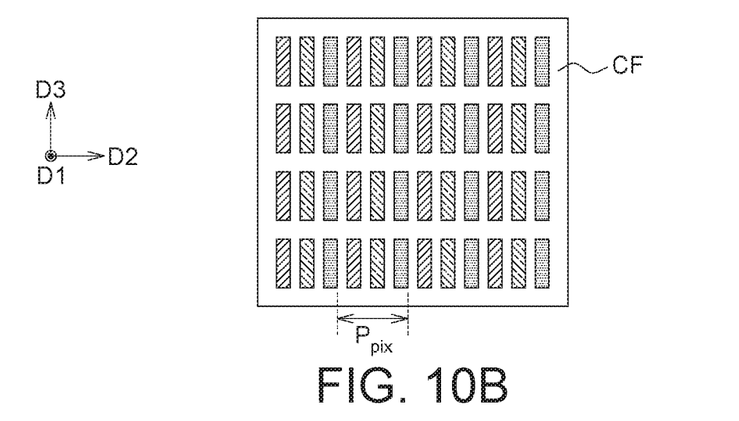
FIG. 10B shows a top view of a pixel array of a display panel of a display device.
Figure 10C:
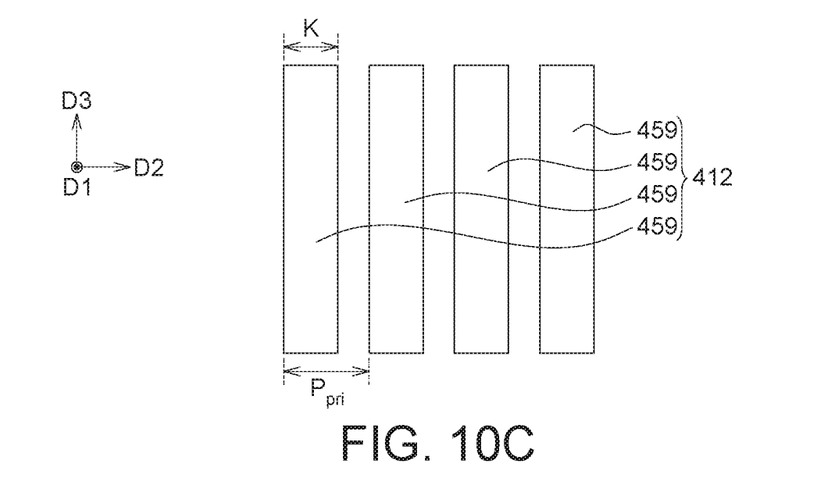
FIG. 10C shows an arrangement of an electrode layer of a switching panel of a display device.

FIG. 10A to FIG. 10C are referred to element arrangements of a display device for an embodiment. Referring to FIG. 10A, which shows a top view of a light shielding layer 553 of a switching panel of the display device, the light shielding layer 553 defines apertures 555 and has an arrangement with a pixel pitch $P_{pix}$ in the second direction D2. Referring to FIG. 10B, which shows a top view of a pixel array of the display panel of the display device, the pixel array may have the pixel pitch $P_{pix}$. In some examples, tone pixel may include three sub-pixels (for example, a red sub-pixel, a green sub-pixel, and a blue sub-pixel). But the disclosure is not limited thereto. Referring to FIG. 10C, which shows an arrangement of an electrode layer 412 of a switching panel of the display device, the electrode layer 412 comprising electrode strips 459 separated from each other and arranged with an electrode pitch $P_{pri}$ in the second direction D2. For example, the second direction D2 may be substantially parallel to the scan lines of the display panel.

The electrode strip 459 may have a width K in the second direction D2. Referring to FIG. 10A to FIG. 10C, in an embodiment, the pixel pitch $P_{pix}$ and the electrode pitch $P_{pri}$ may satisfy the following formula: $1/10 < P_{pri}/P_{pix} < 10$. In some examples, the width K and the electrode pitch $P_{pri}$ may satisfy the following formula: $1/10 < K/P_{pri} < 1$. If the configurations of the display panel and the switching panel meet one of the formulas above, a moiré pattern may be produced to cover the displayed images when watching in the oblique viewing angle.

Figure 11A:
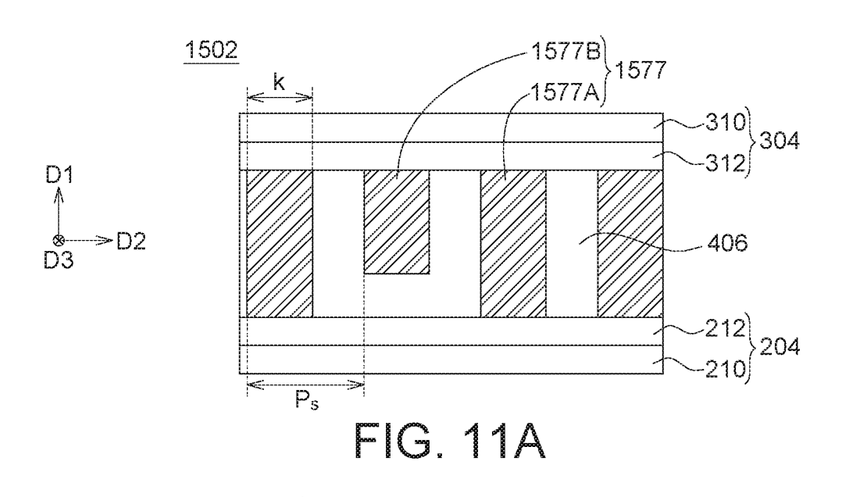
FIG. 11A shows a cross-section view of a switching panel for a display device.
Figure 11B:
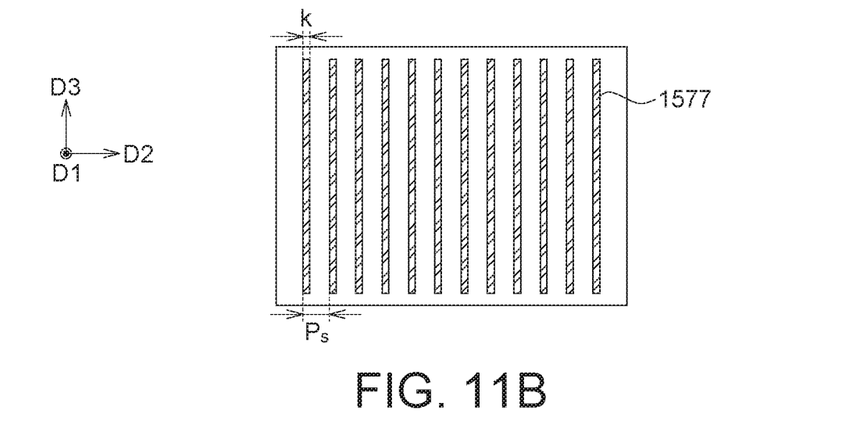
FIG. 11B shows a top view of spacers according an embodiment.
Figure 11C:
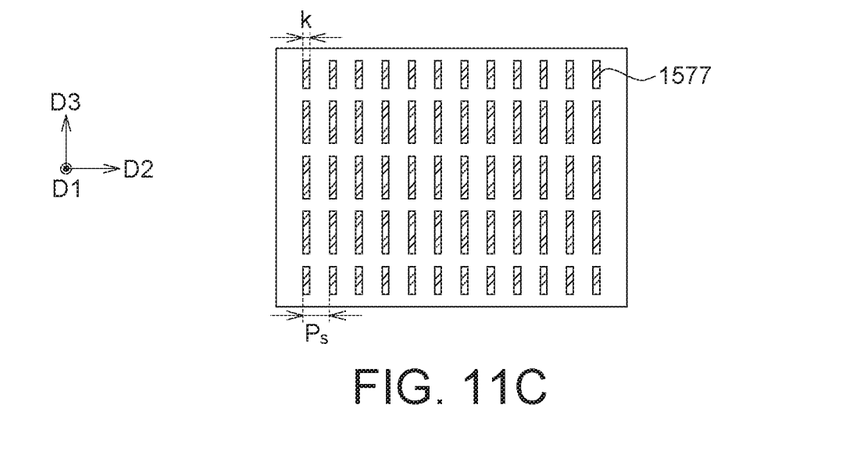
FIG. 11C shows a top view of spacers according another embodiment

FIG. 11A to FIG. 11C are referred for element arrangements of a display device.

FIG. 11A shows a cross-section view of a switching panel 1502 for a display device. Spacers 1577 are disposed between the first substrate 204 and the second substrate 304. Spacers 1577 may be separated from each other in the second direction D2. The spacers 1577 may have a width k in the second direction D2. The spacers 1577 may comprise a spacer 1577A adjoined between the first substrate 204 and the second substrate 304. The spacers 1577 may comprise a spacer 1577B adjoined with one of the first substrate 204 and the second substrate 304, and separated from the other of the first substrate 204 and the second substrate 304 by the liquid crystal layer. For example, the spacer 1577B is adjoined the second substrate 304, and is separated from the first substrate 204 by the display medium layer 406. Referring to FIG. 11B, which shows a top view of the spacers 1577 according an embodiment, the spacers 1577 are continuously extended along the third direction D3. Referring to FIG. 11C, which shows a top view of spacers according another embodiment, the spacers 1577 are separated from each other in the third direction D3. In an embodiment, the spacers 1577 shown in FIG. 11A to FIG. 11C may be arranged corresponding to sub-pixels or pixels. Please refer back to FIG. 11B, the display panel has a pixel pitch $P_{pix}$. In one embodiment, the pixel pitch $P_{pix}$ and the spacer pitch $P_s$ may satisfy the following formula: $1/10 < P_s/P_{pix} < 10$. In some examples, the width k and the spacer pitch $P_s$ may satisfy the following formula: $1/10 < k/P_s < 1$. If the configurations of the display panel and the switching panel meet one of the formulas above, a moiré pattern may be produced to cover the displayed images when watching in the oblique viewing angle.

Figure 12A:
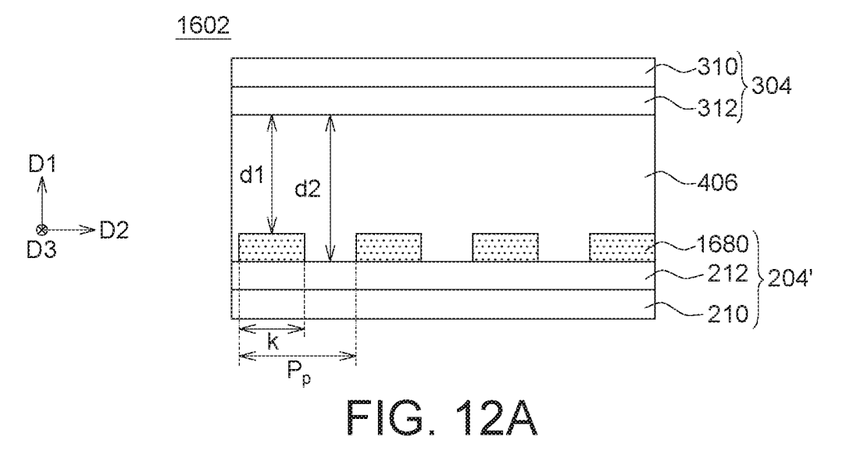
FIG. 12A shows a cross-section view of a switching panel for a display device according to an embodiment.
Figure 12B:
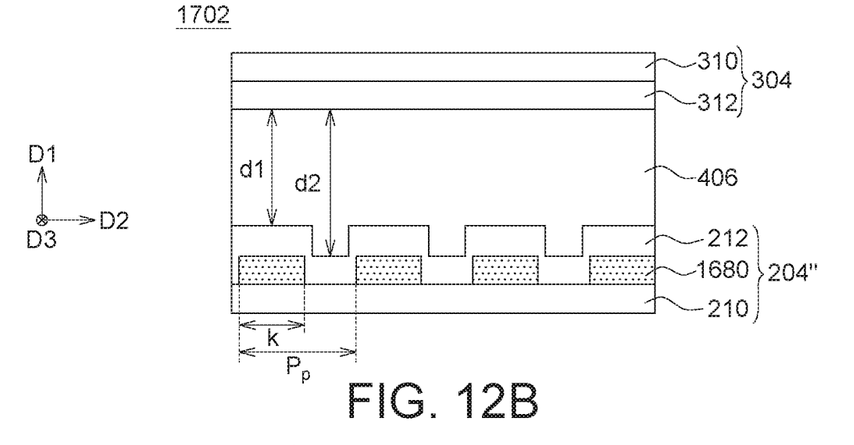
FIG. 12B shows a cross-section view of a switching panel for a display device according another embodiment.
Figure 12C:
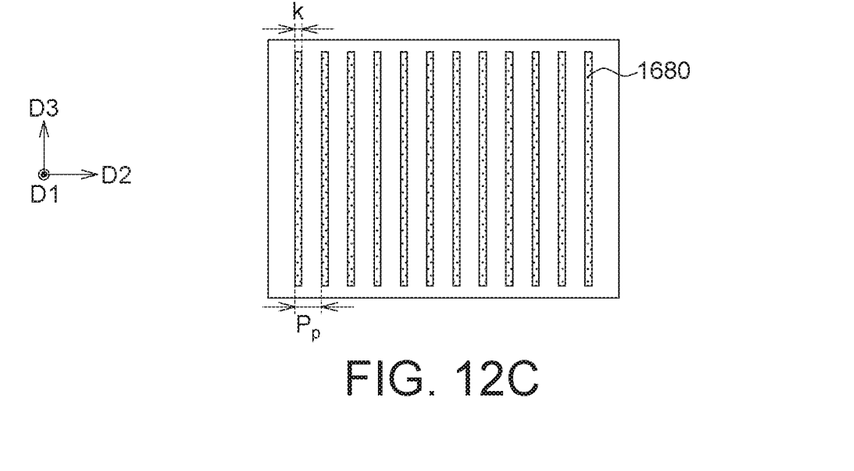
FIG. 12C shows a top view of a photo-resist pattern according to an embodiment.

FIG. 12A to FIG. 12C are referred for element arrangements of a display device.

FIG. 12A shows a cross-section view of a switching panel 1602 for a display device according to an embodiment. A first substrate 204' may comprise a plurality of pattern units 1680 disposed on the base layer 210 so as to form a cell gap d1 and a cell gap d2 different each other in the display medium layer 406 between the first substrate 204' and the second substrate 304. In one example, the first cell gap d1 corresponds to one of the plurality of patterned units 1680 and the second cell gap d2 corresponding to one of the spacings between the plurality of patterned units 1680. The material of the pattern 1680 may be a photoresist. The width of one unit in a second direction is k. The pitch of the patterned unit is $P_p$. Please refer back to FIG. 10B, the display panel has a pixel pitch $P_{pix}$. In one embodiment, the pixel pitch $P_{pix}$ and the patterned unit pitch $P_p$ may satisfy the following formula: $1/10 < P_p/P_{pix} < 10$. In some examples, the width k and the patterned unit pitch $P_p$ may satisfy the following formula: $1/10 < k/P_p < 1$. In other examples, the cell gap d1 and the cell gap d2 may satisfy the following formula: $1 \leq d2/d1 \leq 3$. If the configurations of the display panel and the switching panel meet one of the formulas above, a moiré pattern may be produced to cover the displayed images when watching in the oblique viewing angle.

FIG. 12B shows a cross-section view of a switching panel 1702 for a display device according another embodiment, which is different from the switching panel 1602 in FIG. 12A in that a first substrate 204" comprises the photo-resist pattern 1680 disposed between the electrode layer 212 and the base layer 210.

FIG. 12C shows a top view of the photo-resist pattern 1680 according to an embodiment. The photo-resist pattern 1680 has strips separated from each other in the second direction D2, and extended in the third direction D3.

Figure 13:
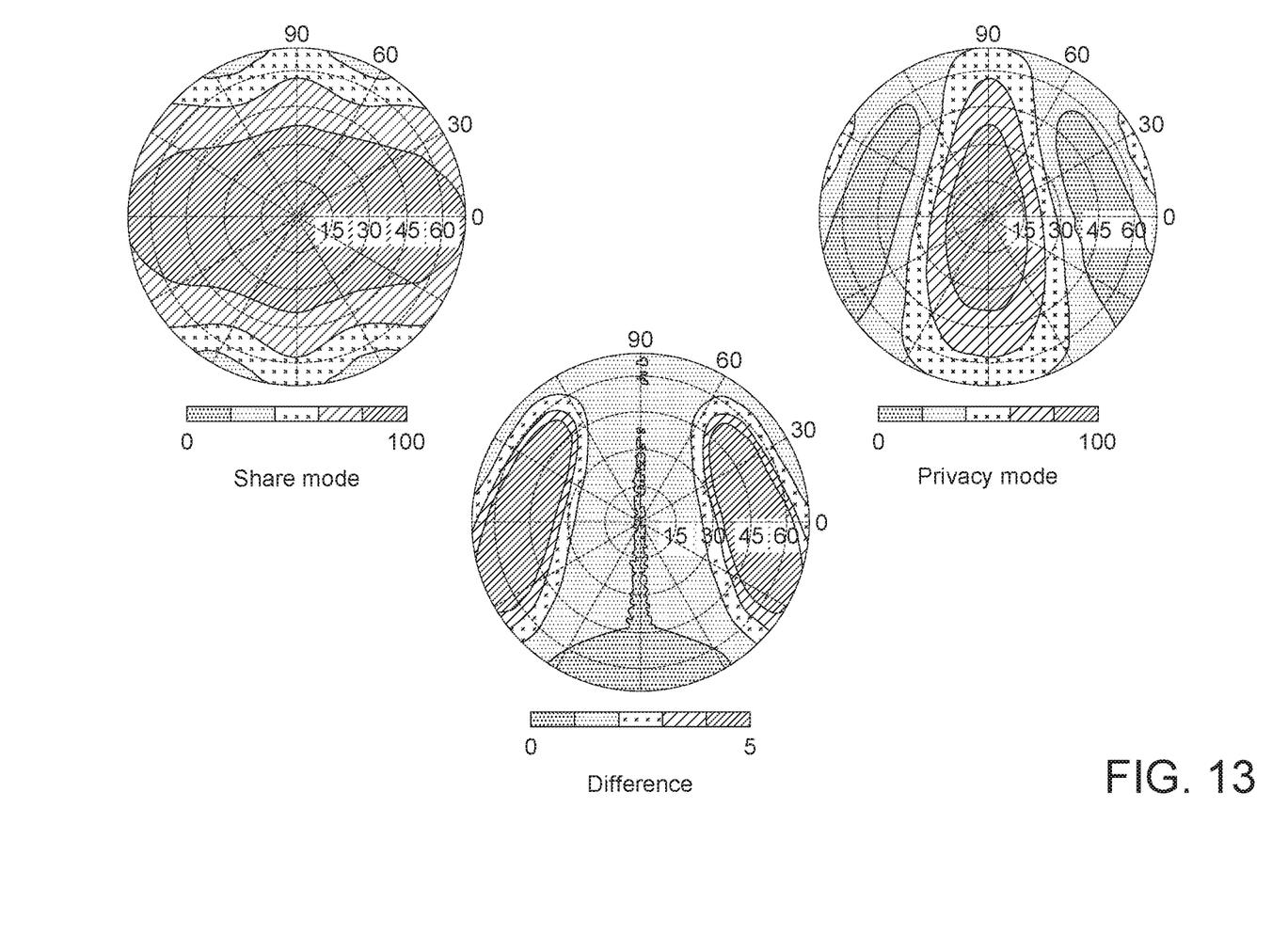
FIG. 13 shows measured image brightness distributions of a display device with anti-parallel alignment directions of a first alignment layer and a second alignment layer.

FIG. 13 shows measured image brightness distributions of the display device with the anti-parallel alignment directions of the first alignment layer and the second alignment layer. In the sharing mode, a brightness measured in an oblique viewing angle even up to 60 degrees is similar to a brightness measured in the normal viewing angle (0 degree). In the privacy mode, a brightness measured in an oblique viewing angle greater than about 15 degrees is significantly lower than the brightness measured in the normal viewing angle. Difference between the image brightness of the share mode and the privacy mode shows there is no substantial change in brightness in the normal viewing angle between the two modes.

Figure 14:
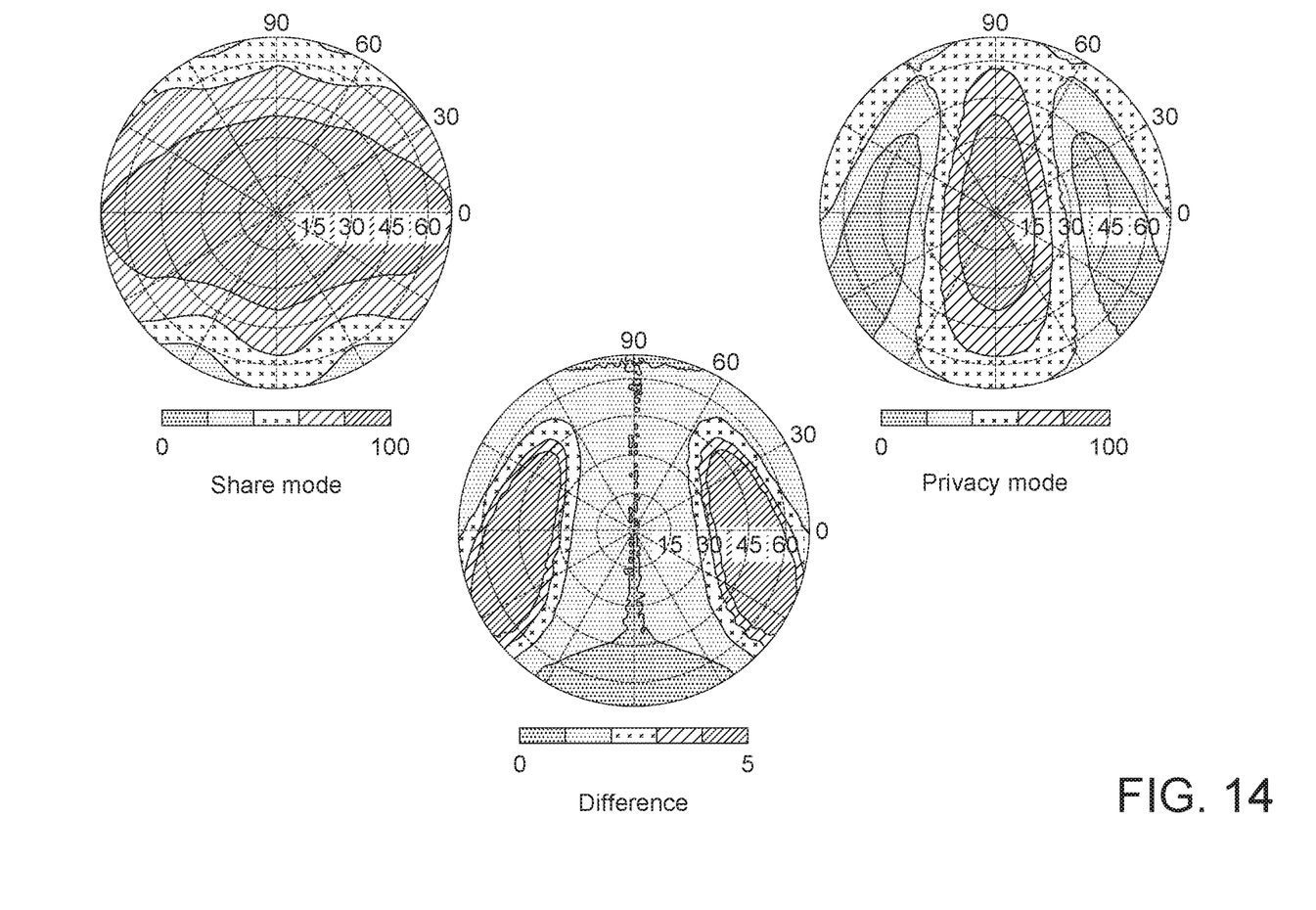
FIG. 14 shows measured image brightness distributions of a display device with parallel alignment directions of a first alignment layer and a second alignment layer.

FIG. 14 shows measured image brightness distributions of the display device with the parallel alignment directions of the first alignment layer and the second alignment layer. In the sharing mode, a brightness measured in an oblique viewing angle even larger than 60 degrees is similar to a brightness measured in the normal viewing angle. In the privacy mode, a brightness measured in an oblique viewing angle larger than about 15 degrees is significantly lower than the brightness measured in the normal viewing angle. Difference between the image brightness of the share mode and the privacy mode shows there is no substantial change in brightness in the normal viewing angle between the two modes. The difference shown in FIG. 14 also shows a greater dark region in the oblique viewing angle than that shown in FIG. 13, which means the display device in FIG. 14 can provide a better privacy effect with a wider oblique viewing angle in which an image darker than that in the normal viewing angle can be seen.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display device, comprising:
   a switching panel, comprising:
   a first polarizer comprising a first absorption axis;
   a second polarizer disposed opposite to the first polarizer, the second polarizer comprising a second absorption axis parallel to the first absorption axis;
   a first substrate disposed between the first polarizer and the second polarizer, the first substrate comprising a first alignment layer having a first alignment direction;
   a second substrate disposed between the first polarizer and the second polarizer, the second substrate comprising a second alignment layer having a second alignment direction, the second alignment direction parallel or anti-parallel to the first alignment direction;
   a display medium layer disposed between the first substrate and the second substrate; and a compensating layer has a slow axis parallel or perpendicular to the second alignment direction,
wherein the compensating layer comprises a first compensating layer and a second compensating layer, wherein the first compensating layer is disposed between the first substrate and the first polarizer, and the second compensating layer is disposed between the second substrate and the second polarizer, wherein a sum of an in-plane retardation (Re) of the first compensating layer and an in-plane retardation (Re) of the second compensating layer is in a range from 0 nm to 135 nm.

2. The display device according to claim 1, wherein a sum of an out of plane retardation (Rth) of the first compensating layer and an out of plane retardation (Rth) of the second compensating layer is in a range from 40 nm to 1200 nm.

3. The display device according to claim 1, wherein the switching panel has a cell retardation in a range from 400 nm to 1200 nm.

4. The display device according to claim 1, wherein the second alignment direction is parallel to the first alignment direction.

5. The display device according to claim 1, wherein the display medium layer comprises a dye material, and a concentration of the dye material is in a range from 0 wt. % to 5 wt. %.

6. The display device according to claim 1, further comprising a display panel disposed opposite to the switching panel.

7. The display device according to claim 6, wherein the display device further comprises a third polarizer having a third absorption axis perpendicular to the first absorption axis.

8. The display device according to claim 6, wherein one of the first substrate and the second substrate comprises a patterned electrode layer.

9. The display device according to claim 8, wherein the display panel comprises a pixel array having a pixel pitch $P_{pix}$, the patterned electrode layer comprises a plurality of electrodes having an electrode pitch $P_{pri}$, wherein the pixel pitch $P_{pix}$ and the electrode pitch $P_{pri}$ satisfy the following formula:

$$1/10 < P_{pri}/P_{pix} < 10.$$

10. The display device according to claim 8, wherein the patterned electrode layer comprises a plurality of electrodes having an electrode pitch $P_{pri}$, and a width of one of the electrodes is defined as K, wherein the electrode pitch and the width K satisfy the following formula:

$$1/10 < K/P_{pri} < 1.$$

11. The display device according to claim 6, wherein the switching panel comprises a plurality of spacers disposed between the first substrate and the second substrate, the display panel comprises a pixel array having a pixel pitch $P_{pix}$, and the plurality of spacers have a spacer pitch $P_s$, wherein the pixel pitch $P_{pix}$ and the spacer pitch $P_s$ satisfy the following formula:

$$1/10 < P_s/P_{pix} < 10.$$

12. The display device according to claim 11, wherein a width of one of the spacers is defined as k, wherein the spacer pitch $P_s$ and the width k satisfy the following formula:

$$1/10 < k/P_s < 1.$$

13. The display device according to claim 6, wherein the first substrate comprises a plurality of patterned units disposed on a base layer, the display panel comprises a pixel array having a pixel pitch $P_{pix}$, and the plurality of patterned units have a patterned unit pitch $P_p$, wherein the pixel pitch $P_{pix}$ and the patterned unit pitch $P_p$ satisfy the following formula:

$$1/10 < P_p/P_{pix} < 10.$$

14. The display device according to claim 13, wherein the switching panel has a first cell gap corresponding to one of the plurality of patterned units and a second cell gap corresponding to one of spacings between the plurality of patterned units, wherein the first cell gap is less than the second cell gap.

* * * * *